Jan. 24, 1967  J. J. SANTAMARIA ETAL  3,299,638
VARIABLE FLOW DEFLECTION MEANS
Filed March 12, 1965  4 Sheets-Sheet 1

BYRON R. WINBORN
JESSE J. SANTAMARIA
INVENTORS

BY  Robert M. Sperry
ATTORNEY

Jan. 24, 1967  J. J. SANTAMARIA ETAL  3,299,638
VARIABLE FLOW DEFLECTION MEANS
Filed March 12, 1965  4 Sheets-Sheet 4

BYRON R. WINBORN
JESSE J. SANTAMARIA
INVENTORS

BY Robert M. Sperry
ATTORNEY

United States Patent Office 3,299,638
Patented Jan. 24, 1967

1

3,299,638
VARIABLE FLOW DEFLECTION MEANS
Jesse J. Santamaria, Dallas, and Byron R. Winborn, Irving, Tex., assignors to LTV Aerospace Corporation, Dallas, Tex., a corporation of Delaware
Filed Mar. 12, 1965, Ser. No. 439,161
9 Claims. (Cl. 60—204)

This invention relates to thrust vectoring means for vertical take-off and landing (VTOL) aircraft and is particularly directed to means for deflecting the outlet flow of a turbofan for maneuvering VTOL aircraft.

As is well known, VTOL aircraft require power plants which can produce high thrust. Moreover, it is known that turbofans having a high by-pass ratio are capable of producing static thrusts which are two to three times greater than the thrust obtainable by the parent engine when used as a turbojet. It is also necessary that means be provided for vectoring the thrust upward for VTOL operation, and for vectoring the thrust forward for wing-borne flight. Furthermore, it is highly desirable that the transition between the VTOL flight mode and the wing-borne flight mode be as smooth as possible. Numerous systems have been proposed heretofore for accomplishing these objectives. Unfortunately, none of the prior art systems have been entirely satisfactory. Thus, it has been suggested that the propulsion system or the entire wing could be rotated to provide the desired thrust vectoring. However, this requires extremely complex and rugged rotation mechanism which imposes a serious weight penalty on the aircraft. It has also been proposed to mount the propulsion system in a fixed position and to provide various means for deflecting the outflow of the propulsion system to achieve the desired thrust vectoring. Most of these systems have resulted in high thrust losses in one or both modes of operation and many have failed to provide smooth operation during transition from one flight mode to the other.

These disadvantages of the prior art are overcome with the present invention and a thrust vectoring system is provided wherein the propulsion system is mounted in a fixed position and means are provided for deflecting the outflow of the propulsion system in a manner which enhances the thrust of the propulsion system while permitting smooth operation during the entire transition from one flight mode to the other.

The advantages of the present invention are preferably attained by providing a thrust vectoring system comprising an aircraft, a high bypass ratio turbofan mounted in a fixed position on said aircraft, a diffusion chamber located aft of said turbofan to receive and diffuse the outflow from said turbofan, and a multistage cascade of vane members of predetermined cross-section movable in a predetermined manner to direct said outflow in a desired direction.

Accordingly, it is an object of the present invention to provide an improved thrust vectoring system.

Another object of the present invention is to provide a thrust vectoring system which avoids the necessity of rotating large components.

An additional object of the present invention is to provide a thrust vectoring system which enhances the thrust developed by the propulsion system.

A further object of the present invention is to provide a thrust vectoring system which permits smooth operation during the entire transition between the VTOL flight mode and the winged flight mode.

A specific object of the present invention is to provide a thrust vectoring system comprising an aircraft, a high bypass ratio turbofan mounted in a fixed position on said aircraft, a diffusion chamber located aft of said turbofan to receive and diffuse the outflow from said turbofan, and a multistage cascade of vane members of predetermined

2 cross-section movable in a predetermined manner to direct said outflow in a desired direction.

These and other objects and features of the present invention will be apparent from the following detailed description taken with reference to the figures of the accompanying drawings.

Figure 1:
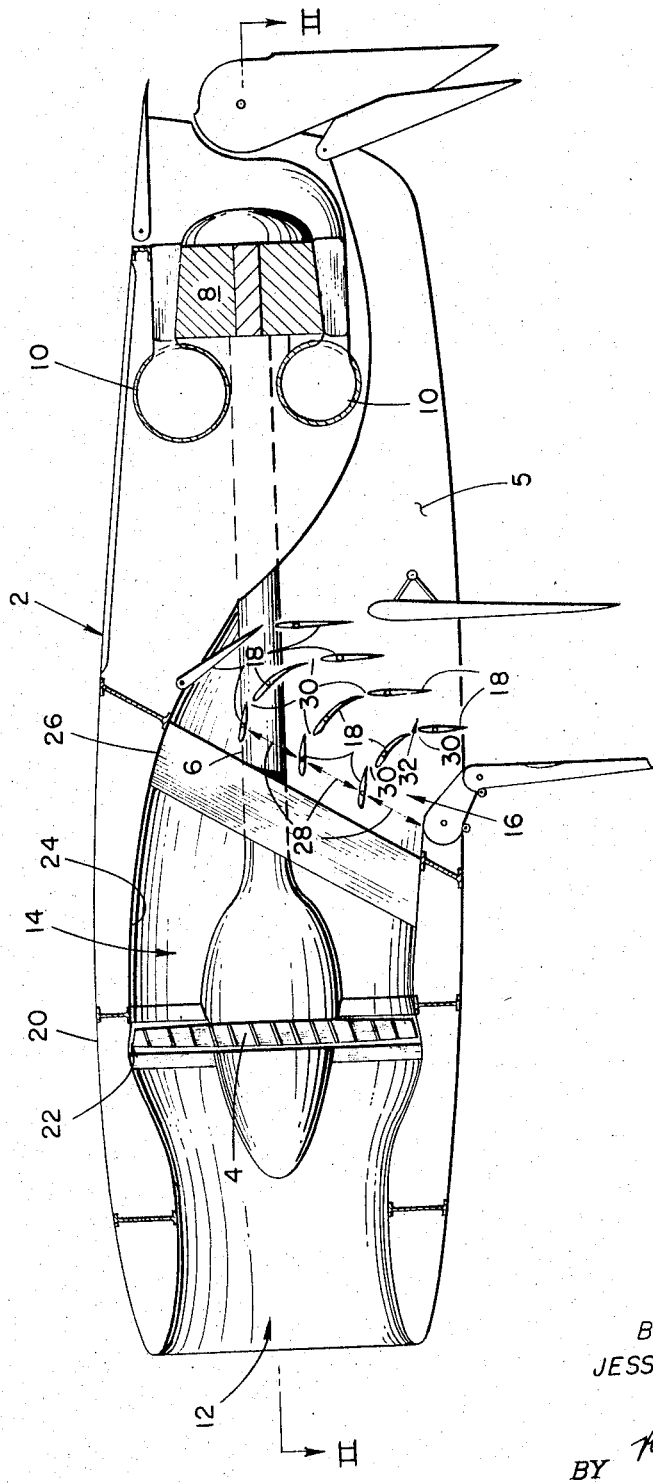
FIGURE 1 is a vertical section through the turbofan housing of an aircraft embodying the thrust vectoring system of the present invention with parts shown in position for full deflection.
Figure 2:
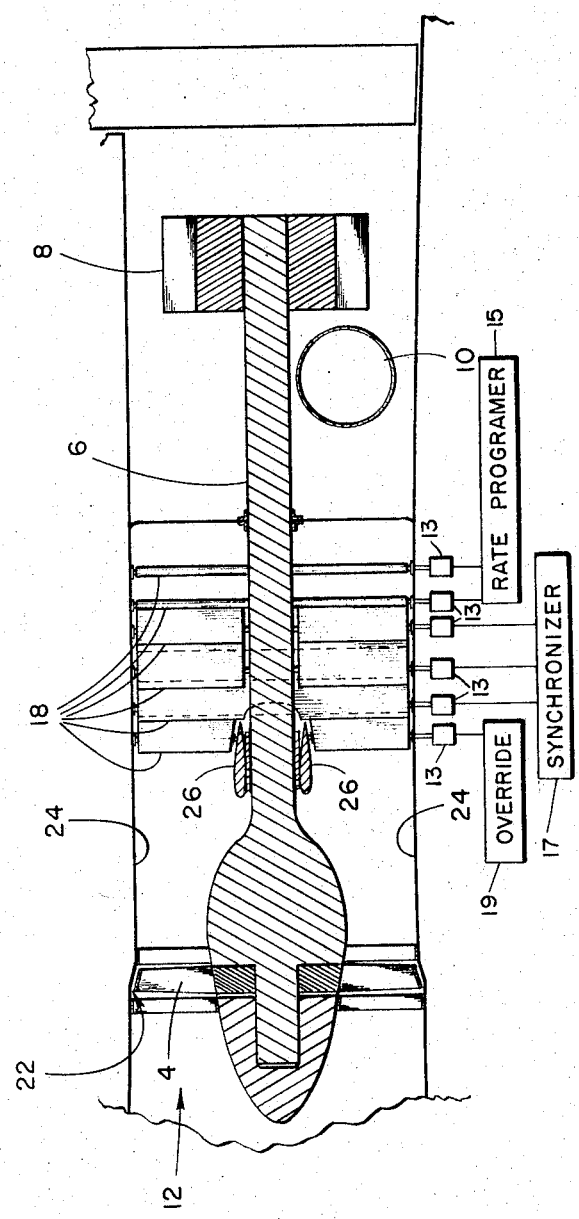
FIGURE 2 is a transverse section through the apparatus of FIGURE 1, taken on the line II—II thereof.

In that form of the present invention chosen for purposes of illustration in the drawings, FIGURE 1 shows a fan housing, indicated generally at 2, encircling a fan 4 which is driven, through shaft 6, by a turbine 8. The turbine 8 is driven by exhaust from a jet engine, not shown, through ducts 10. Ram air is delivered to the fan 4 by inlet opening 12 and is compressed by the fan 4 to provide propulsive thrust. From the fan 4, the air is blown into a diffusion chamber 14 and is exhausted through a multistage cascade 16 of vane members 18 which are movable to deflect the air as required to effect the desired thrust vectoring.

It can be shown that the flow losses arising in a deflecting mechanism, such as the cascade 16, are closely related to the dynamic pressure of the approaching airflow and that such losses can be reduced by diffusing the airflow from fan 4, as in the diffusion chamber 14. However, the design of diffusion chambers has been one of the major problems of the prior art. The main causes of thrust losses in diffusion chambers of the prior art are the development of eddy currents in the air flow through the chamber and separation of the air flow from the walls of the diffusion chamber. Such separations often result from the use of fans having excessive clearance between the fan blades and the fan shroud and which direct the air flow straight through the diffusion chamber whereas the walls of the diffusion chamber diverge in the direction of flow. This permits development of a relatively thick, low energy boundary layer along the walls of the chamber together with a rapid build-up of static pressure in the direction of flow. Hence, downstream air, at higher static pressure, tends to reverse direction and to flow backward through the low energy boundary layer, setting up eddies and causing the main body of flow to separate from the walls of the chamber. This results in severe flow losses and breakdown of the diffusion process. Prior art designers have attempted to avoid this problem by designing diffusion chambers having walls forming angles of less than about seven degrees with the axis of the chamber. Unfortunately, this approach requires relatively long diffusion chambers having a large surface area exposed to the flow with the result that frictional flow losses become excessive and diffusion efficiency suffers.

In accordance with the present invention, the clearance between the fan 4 and the fan shroud 20, is made as small as possible, as indicated at 22, typically about .030 inch. Moreover, the fan 4 is designed to impart maximum energy to the flow near the walls. Fans of this design are well-known in the art and serve to produce an air flow in the chamber 14 which is essentially the reverse of that described above. Thus, the air flow from fan 4 is directed primarily along the walls 24 of the diffusion chamber 14 and any air escaping from this peripheral flow will establish a central core of turbulence which throws energy radially outward and acts to prevent separation. The losses occurring in this central core of turbulence are moderate, being of the order of 10% to 15% of the power input for a wel-designed fan. At the same time, some of this loss is effectively recovered since the resulting flow characteristics permit the diffusion chamber 14 to be designed with the walls 22 diverging at angles of up to 35 degrees. Consequently, the length of the diffusion chamber 14 may be greatly reduced over those of the prior art and frictional losses are minimized. Accordingly, the pressure and velocity of the air flow are reduced in the diffusion chamber 14 and deflection of the air flow is initiated by curved portion 26 of the wall 24 of chamber 14 with minimal loss of thrust.

The multistage cascade 16 completes the deflection of the air flow and also contributes to the improved performance obtainable with the thrust vectoring system of the present invention. Most of the prior art systems have employed either a solid curve or a single stage cascade of vane members which are movable to form a solid curve to accomplish deflection of the fan outflow. However, neither of these are satisfactory. Since the air flow in a bend is subjected to centrifugal force, equal to the square of the flow velocity divided by the radius of curvature, there is an increase of pressure toward the outside of the bend. This is accomplished at constant total pressure with the result that a high velocity low pressure area is created on the inside of the bend while a relatively low velocity, high pressure area is created at the outside of the bend. Due to the centrifugal force, the air at the outside of the bend cannot pass through the main flow to the low pressure area at the inside of the bend. However, there will be some boundary layer air along the opposite sides of the bend and the air at the outside of the bend tends to spill through these boundary layers to the inside of the bend with the result that two large, counter-rotating vortices are created. This leads to creation of eddy currents, separation of flow from the inner wall of the bend, and other effects resulting in substantial loss of thrust.

With the multistage cascade 16 of the present invention, centrifugal force also causes build-up of static pressure radially of the bend. However, this occurs only from the outer surface of the vanes 18 at one position to the inner surface of the vanes 18 at the next outer position, as indicated by arrows 28. The loads attributable to such centrifugal forces are dispersed through the vane member 18 to the frame of the aircraft. Hence, there is no sustained build-up of static pressure across the duct and no tendency to form a major flow disturbance, such as the twin vortices described above. Moreover, even when the cascade 16 is in the full deflection position, illustrated in FIGURE 1, slots 30 exist between the adjacent vane members 18 of each stage of the cascade 16. Consequently, some of the high pressure air from one stage can escape through the slots 30 to the low pressure area of the next outer stage, as indicated by arrow 32. This serves further to equalize the pressure across the duct and also acts to control boundary layers which might develop on the outer surfaces of the vanes 18.

Figure 4:
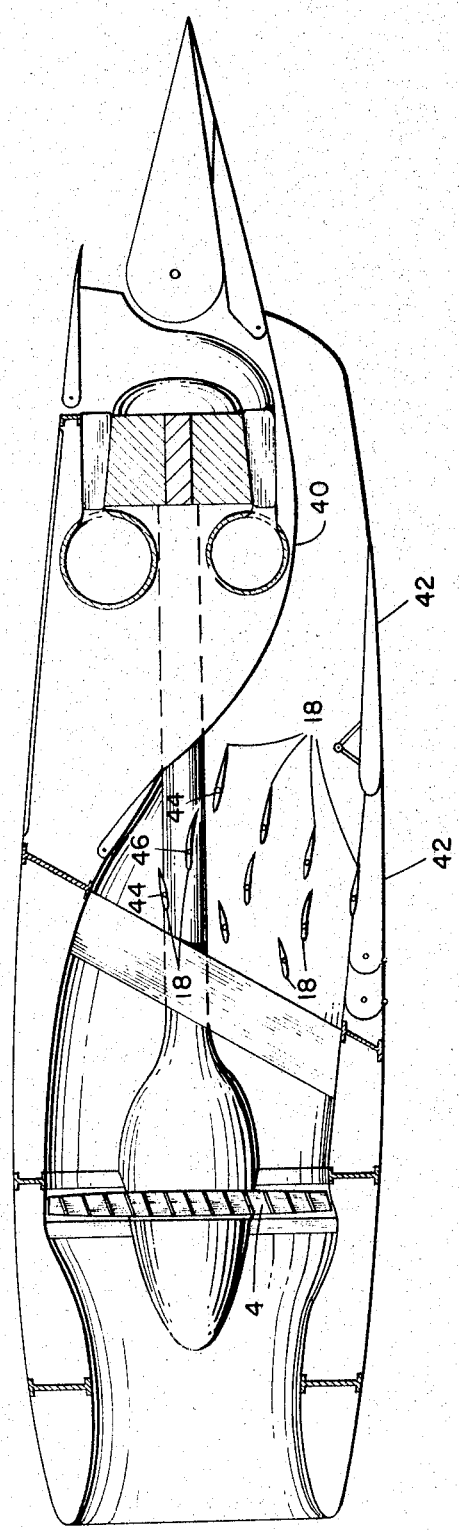
FIGURE 4 is a view, similar to that of FIGURE 1, with parts shown in position for winged flight.

To vary the deflection of the air flow for various flight modes, the vanes 18 of cascade 16 are infinitely variable between the full deflection position of FIGURE 1 and the cruise position of FIGURE 4. Any suitable means may be provided for accomplishing this, such as servomotors 13. However, the position of the vanes 18 and the manner in which they are moved add to the performance of the thrust vectoring system of the present invention. Thus, in the full deflection position, illustrated in FIGURE 1, it will be seen that the vanes 18 serve to converge the air flow as it passes through the cascade 16. As described above, the diffusion chamber 14 allows the air flow to expand to reduce the velocity and dynamic pressure of the air flow and, thereby, reduce flow losses during the initial deflection of the air flow by portion 26 of the wall 24. By converging the air flow, the cascade 16 serves to re-accelerate the flow to high velocity to produce the desired output thrust. Furthermore, convergence of the air flow leads to a reduction of static pressure downstream which suppresses any tendency for the flow to blow back to low pressure areas and reduces any tendency toward separation at the inner surfaces of the cascade 16.

Figure 3:
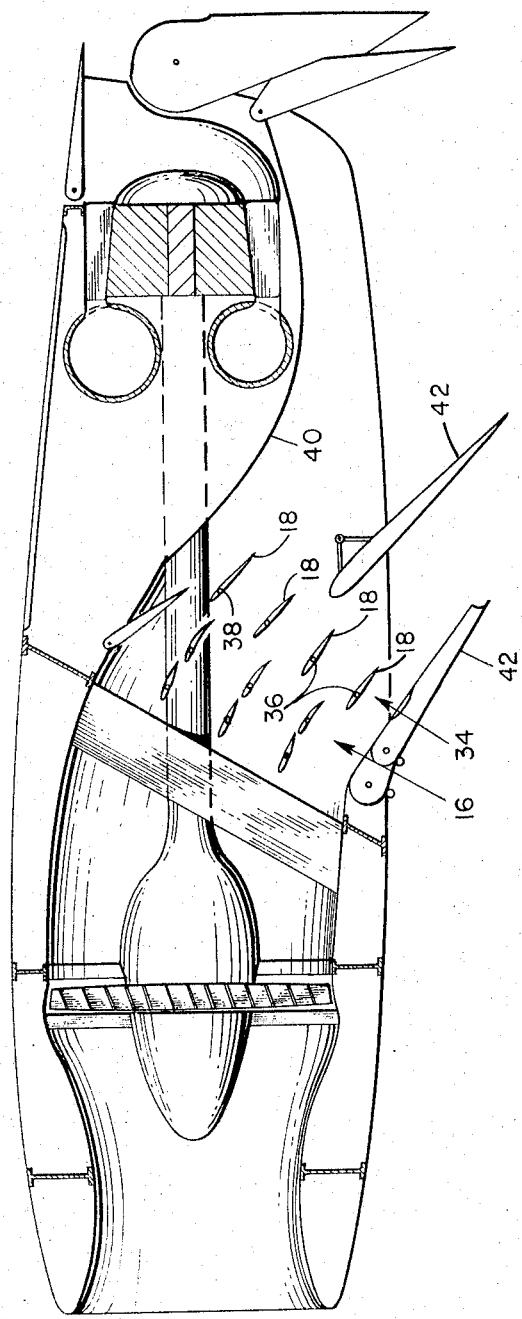
FIGURE 3 is a view, similar to that of FIGURE 1, with parts shown in position for half deflection.

In moving from the full deflection position of FIGURE 1 to the half deflection position of FIGURE 3, only the vanes 18 of the third stage 34 of cascade 16 are moved. However, if all of the vanes 18 of the third stage 34 were moved in unison, the effective jet nozzle area would increase as the deflection decreased with a substantial reduction in developed thrust. To overcome this, the lower vanes 18 of third stage 34, indicated at 36 in FIGURE 3, are programmed by suitable means, such as rate programmer 15, to move more rapidly than the upper vane 18, indicated at 38 in FIGURE 3. In this way, the air flow passing the upper vane 38 is deflected more than the air flow passing the lower vanes 36. Consequently, the air flow from upper vane 38 impinges on the flow from lower vanes 36 and forms a vena contracta downstream from the cascade 16 which becomes the effective jet nozzle.

In moving from the half deflection position of FIGURE 3 to the cruise position of FIGURE 4, all of the vanes 18 of cascade 16 move simultaneously by suitable means, such as synchronizer 17, and the jet nozzle area is determined by the afterbody plug, indicated at 40, and by lower surface doors 42.

To minimize flow losses during the cruise or winged flight mode, illustrated in FIGURE 4, the contour and positioning of the vanes 18 of cascade 16 is of importance. As shown, the vane members 18 of the first and third stages of cascade 16 are symmetrical in cross section, as indicated at 44, while the vane members 18 of the second stage have cambered cross sections, as seen at 46.

It is well known that cambered vanes can deflect air more efficiently than can vanes of symmetrical cross section. Accordingly, the vane members 18 of the second stage of cascade 16 are cambered, as seen at 46. However, if the vane members 18 of the first and third stages of cascade 16 were also cambered, it would be impossible to avoid substantial deflection of the air flow when the vane members 18 were in the cruise position and significant flow losses would result. On the other hand, by forming the vane members 18 of the first and third stages of cascade 16 with symmetrical cross sections, as seen at 44, efficient operation can be obtained for deflecting operations, as described above, as well as in the cruise position.

It has been found that airfoils of symmetrical cross section can be rotated to deflect passing air as much as ten degrees with no greater losses than occur when the airfoil is axially aligned with the air flow. On the other hand, cambered airfoils must deflect the air flow approximately ten degrees in order to reach their minimum loss range but can provide substantially greater deflection without increased loss. Accordingly, as shown in FIGURE 4, for minimum losses in the cruise mode, the vanes 18 of the first stage of cascade 16 are positioned to deflect the air flow approximately ten degrees upward, as indicated at 48. Flow in this direction is received with minimum loss by the cambered vanes of the second stage of cascade 16 which provide a twenty-degree downward deflection, causing the air flow to leave the second stage with a net deflection of ten degrees downward. The symmetrical vanes of the third stage could return the flow to its original direction. However, study of the passages presented to the flow by the plug nozzle 40 indicates that it is advantageous to have the flow leave the cascade with a downward inclination. Accordingly, the vanes of the third stage are set in a neutral position with respect to the flow from the second stage.

If desired, the vanes 18 of the first stage of the cascade 16 may be made separately positionable, as by override means 19. Numerous advantages are obtainable by this. Thus, during flight, the pilot may open the doors 42, tending to "high flow" the fan 4, and may throw the first stage of the cascade 16 into a high loss position while reducing power. These actions cooperate to provide a very powerful braking thrust which permits rapid deceleration. Furthermore, for hovering flight, if the pilot establishes a power setting which would cause the airplane to rise, and adjusts the vanes 18 of the first stage of cascade 16 to a suitable loss position, it is possible to maintain precise and highly sensitive hover control without requiring constant readjustment of the power setting.

Numerous other variations and modifications may also be made without departing from the invention. Accordingly, it should be clearly understood that the form of the invention described above and shown in the figures of the accompanying drawing is illustrative only and is not intended to limit the scope of the invention.

What is claimed is:
1. The method of vectoring the outflow from a shrouded turbofan having a plurality of groups of movable vane members positioned to receive the outflow from said turbofan, said method comprising the steps of:
   diffusing said outflow to minimize losses during deflection of said outflow,
   moving said groups at a common rate between a minimum loss position and a 45-degree deflection position, and
   moving one of said groups more rapidly than a second of said groups between said 45-degree deflection position to cause said outflow to converge to provide maximum thrust.
2. A thrust vectoring system for aircraft comprising:
   a propulsive fan mounted in fixed position on said aircraft;
   shroud means closely encircling said fan;
   a diffusion chamber located aft of said fan to receive and diffuse the outflow from said fan and having a curved surface for deflecting said outflow;
   a multi-stage cascade of vane members positioned adjacent said chamber to receive and deflect said outflow;
   each stage of said cascade formed of a plurality of movable vane members spaced from each other along a radius of the curve through which said outflow is to be deflected to equalize static pressure along said radius;
   the vane members of each stage mounted in a predetermined relationship with the corresponding vane members of the adjacent stages of said cascade for cooperating with each other in all positions of said vane members to form a plurality of substantially continuous guide means defining a plurality of similar vectoring paths for respective portions of said outflow; and
   means for synchronously moving said vane members.
3. The apparatus of claim 2 further comprising:
   said fan formed to drive said outflow along the walls of said diffusion chamber.

4. The apparatus of claim 2 further comprising:
   slot means formed between said corresponding vane members of adjacent stages of said cascade at all positions of said vane members to equalize static pressure.
5. The apparatus of claim 2 further comprising:
   means for moving the vane members of the first stage of said cascade independently of the vane members of the other stages of said cascade.
6. The apparatus of claim 2 wherein said multi-stage cascade is a three-stage cascade comprising:
   a first stage and a third stage each consisting of a plurality of vane members of symmetrical airfoil cross-section extending transversely across said chamber; and
   a second stage consisting of a plurality of vane members of cambered airfoil cross-section extending across said chamber between said first and third stages.
7. The apparatus of claim 6 further comprising:
   first and second groups of vane members forming said third stage of said cascade; and
   means for moving said groups at a common rate between a cruise position and a 45-degree deflection position, and for moving said first group more rapidly than said second group between said 45-degree deflection position and a full deflection position to cause said outflow to converge to provide maximum thrust.
8. The apparatus of claim 6 further comprising:
   means positioning said vane members of said first stage in cruise position to receive said outflow from said fan and to deflect said outflow approximately ten degrees upward with respect to the axis of said outflow in said diffusion chamber, and
   means positioning said vane members of said second stage in said cruise position to receive said outflow from said first stage and to deflect said outflow approximately twenty degrees downward with respect to the axis of said outflow leaving said first stage.
9. The method of vectoring the outflow from a turbofan, said method comprising the steps of:
   diffusing said outflow to minimize losses during the deflection of said outflow,
   deflecting the diffused outflow, and
   converging the deflected outflow for maximizing the thrust developed by said outflow.

References Cited by the Examiner

UNITED STATES PATENTS

| | | | |
|---|---|---|---|
| 2,879,957 | 3/1959 | Lippisch | 60—35.54 X |
| 2,918,230 | 12/1959 | Lippisch | 60—35.54 X |
| 2,929,580 | 3/1960 | Ciolkosz | 244—12 |
| 3,081,597 | 3/1963 | Kosin et al. | 60—35.55 X |
| 3,241,771 | 3/1966 | Erwin | 244—12 |

FOREIGN PATENTS

| | | |
|---|---|---|
| 967,780 | 8/1964 | Great Britain. |

CARLTON R. CROYLE, *Primary Examiner.*